(12) United States Patent
Kim et al.

(10) Patent No.: US 7,490,493 B2
(45) Date of Patent: *Feb. 17, 2009

(54) STEAM JET DRUM WASHING MACHINE

(75) Inventors: Jin Woong Kim, Kyungki-do (KR); Kyung Chul Woo, Seoul (KR); Soo Young Oh, Seoul (KR); Si Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 525 days.

This patent is subject to a terminal disclaimer.

(21) Appl. No.: 10/753,496

(22) Filed: Jan. 9, 2004

(65) Prior Publication Data

US 2004/0187527 A1 Sep. 30, 2004

(30) Foreign Application Priority Data

Mar. 31, 2003 (KR) ............ 10-2003-0020204

(51) Int. Cl.
*D06F 39/02* (2006.01)
(52) U.S. Cl. .................. 68/15; 68/17 R
(58) Field of Classification Search ........... 68/15; 134/105, 108
See application file for complete search history.

(56) References Cited

U.S. PATENT DOCUMENTS

| | | | | |
|---|---|---|---|---|
| 1,501,746 A | * | 7/1924 | Carter | 68/139 |
| 1,570,552 A | * | 1/1926 | Bowerbank | 34/73 |
| 1,755,101 A | * | 4/1930 | Fording et al. | 34/187 |
| 1,755,746 A | | 4/1930 | Clark et al. | |
| 1,852,179 A | | 4/1932 | McDonald | |
| 2,431,246 A | | 11/1947 | Hallanan | |
| 2,574,098 A | * | 11/1951 | Fraraccio | 134/85 |
| 2,664,094 A | | 12/1953 | Spragins | |
| 2,880,300 A | | 3/1959 | Reimers et al. | |
| 3,025,381 A | * | 3/1962 | Pickering | 392/401 |
| 3,203,013 A | * | 8/1965 | Buss | 8/158 |
| 3,402,576 A | | 9/1968 | Krupsky | |
| 3,410,986 A | * | 11/1968 | Groom | 392/399 |
| 3,443,406 A | * | 5/1969 | Hornback et al. | 68/58 |
| 3,583,181 A | * | 6/1971 | Brillet | 68/18 F |
| 3,615,822 A | * | 10/1971 | Molinari | 134/23 |

(Continued)

FOREIGN PATENT DOCUMENTS

DE 604415 10/1934

(Continued)

OTHER PUBLICATIONS

WIPO WO 97/20493 Jun. 1997.*

*Primary Examiner*—Frankie L Stinson
(74) *Attorney, Agent, or Firm*—Birch, Stewart, Kolasch & Birch, LLP

(57) ABSTRACT

Disclosed herein is a drum washing machine which is capable of lifting clothes to a predetermined height and then dropping the lifted clothes so that the clothes can be washed by means of friction and impact. The drum washing machine is capable of heating wash water and spraying the heated wash water into a tub and a drum of the washing machine in a phase of high-temperature and high-pressure steam, thereby rapidly soaking clothes in the wash water, improving sterilizing and washing efficiencies of the drum washing machine, and saving wash water and electric energy.

28 Claims, 6 Drawing Sheets

U.S. PATENT DOCUMENTS

| | | | | |
|---|---|---|---|---|
| 3,730,682 | A | * 5/1973 | Brubaker et al. | 422/28 |
| 4,287,407 | A | * 9/1981 | Treiber et al. | 392/400 |
| 4,471,792 | A | * 9/1984 | Koblenzer | 134/83 |
| 4,527,343 | A | * 7/1985 | Danneberg | 34/452 |
| 5,180,438 | A | * 1/1993 | Hockh et al. | 134/21 |
| 5,219,371 | A | * 6/1993 | Shim et al. | 8/149.1 |
| 5,255,840 | A | * 10/1993 | Nowotarski | 228/254 |
| 5,361,322 | A | 11/1994 | Glucksman et al. | |
| 5,392,738 | A | 2/1995 | Tsutsumi et al. | |
| 5,425,255 | A | 6/1995 | Pick | |
| 5,439,655 | A | * 8/1995 | Fedegari | 422/297 |
| 5,827,329 | A | * 10/1998 | Champeau | 8/142 |
| 5,962,288 | A | 10/1999 | Aksenov et al. | |
| 5,989,203 | A | 11/1999 | Wang et al. | |
| 6,161,306 | A | 12/2000 | Clodic et al. | |
| 6,299,076 | B1 | 10/2001 | Sloan et al. | |
| 6,311,527 | B1 | 11/2001 | Monteiro et al. | |
| 6,477,868 | B2 | 11/2002 | Chang et al. | |
| 6,585,781 | B1 | * 7/2003 | Roseen | 8/149.1 |
| 6,811,811 | B2 | 11/2004 | Gerald France et al. | |
| 6,854,300 | B2 | 2/2005 | Monteiro et al. | |
| 7,021,087 | B2 | 4/2006 | France et al. | |

FOREIGN PATENT DOCUMENTS

| | | | |
|---|---|---|---|
| DE | 197 43 508 A1 | | 8/1999 |
| GB | 799788 A | | 8/1958 |
| GB | 1222227 A | | 2/1971 |
| GB | 2348213 A | | 9/2000 |
| JP | 61-128995 A | | 6/1986 |
| JP | 2-198595 | * | 8/1990 |
| JP | 04-158896 A | | 1/1992 |
| JP | 5-23493 A | | 2/1993 |
| JP | 10-235088 | | 9/1998 |
| JP | 2000-176192 | * | 6/2000 |
| JP | 2003-19382 | * | 1/2003 |
| JP | 2003-019382 A | | 1/2003 |
| WO | WO-97/15709 A1 | | 5/1997 |
| WO | WO-97/20493 A1 | | 6/1997 |

* cited by examiner

STEAM JET DRUM WASHING MACHINE

This Nonprovisional application claims priority under 35 U.S.C. § 119(a) on Patent Application No(s). 10-2003-0020204 filed in KOREA on Mar. 31, 2003, the entire contents of which are hereby incorporated by reference.

BACKGROUND OF THE INVENTION

1. Field of the Invention

The present invention relates to a drum washing machine which is capable of lifting clothes to a predetermined height and then dropping the lifted clothes so that the clothes can be washed by means of friction and impact, and more particularly to a steam jet drum washing machine which is capable of heating wash water and spraying the heated wash water into a tub and a drum of the washing machine in a phase of high-temperature and high-pressure steam, whereby sterilizing and washing efficiencies of the drum washing machine are improved.

2. Description of the Related Art

A drum washing machine is a kind of washer which is capable of washing clothes by friction between a drum rotated by a motor and the clothes put in the drum while a detergent and wash water are supplied in a horizontally mounted tub and the drum, which is disposed in the tub. With the drum washing machine, the clothes are neither damaged nor tangled with one another. Furthermore, the drum washing machine washes clothes by striking and rubbing the clothes, whereby washing efficiency is improved.

FIG. 1 is a perspective view of a conventional drum washing machine, and FIG. 2 is a side view, in cross section, of the conventional drum washing machine.

As shown in FIGS. 1 and 2, the conventional drum washing machine comprises: a casing 2 forming the exterior of the drum washing machine; a tub 6 disposed in the casing 2 in such a manner that the tub 6 is suspended by means of springs 4 and simultaneously supported by means of damper assemblies 5; a drum 8 rotatably mounted in the tub 6, in which clothes are put and into which wash water is supplied; a plurality of vanes 8a provided on the inner circumference of the drum 8 for lifting the clothes in the drum 8 as the drum 8 is rotated, the vanes 8a being longitudinally extended parallel to the axis of rotation of the drum 8 and inwardly protruded to a predetermined height while the vanes 8a are uniformly spaced apart from each other; and a motor 10 connected to the drum 8 in the rear of the tub 6 for rotating the drum 8.

The drum washing machine further comprises: a water-supply valve assembly 12 mounted above the tub 6 for supplying wash water into the tub 6 and the drum 8; a detergent box assembly 14 also mounted above the tub 6 for supplying a detergent into the tub 6 and the drum 8; and a drainage pump assembly 16 mounted below the tub 6 for draining the wash water from the tub 6 and the drum 8.

The drum 8 is provided at the inner circumference thereof with a plurality of through-holes 8h, through which the wash water flows between the drum 8 and the tub 6. When the drum 8 is rotated to dewater the clothes, the wash water contained in the clothes is separated from the clothes by means of the centrifugal force of the drum 8. At this time, the wash water separated from the clothes is discharged through the through-holes 8h. The water-supply valve assembly 12 includes a water-supply valve (not shown) so that the water-supply valve assembly 12 supplies wash water into the tub 6 and the drum 8 when the water-supply valve is opened. Similarly, the drainage pump assembly 16 includes a drainage pump (not shown) so that the drainage pump assembly 16 discharges the wash water from the tub 6 and the drum 8 when the drainage pump is operated.

To the lower part of the tub 6 is mounted a heater 20 for heating wash water in the tub 6 to a high temperature, by which the washing efficiency is improved. Specifically, the tub 6 includes a heater mounting part 6a formed at the lower part thereof. The heater mounting part 6a of the tub 6 is downwardly extended from the tub 6 so that the heater 20 is mounted in the heater mounting part 6a. The heater 20 is slidably inserted into the heater mounting part 6a of the tub 6 from the front part thereof, and then securely fixed to the heater mounting part 6a of the tub 6.

The operation of the conventional drum washing machine with the above-stated construction will now be described.

When a washing process is performed while clothes are put in the drum 8, the water-supply valve is opened so that a proper amount of wash water is supplied into the tub 6 and the drum 8 depending upon the amount of the clothes. The wash water passes through the water-supply valve assembly 12, and then passes through the detergent box assembly 14. The wash water having passed through the detergent box assembly 14 is supplied into the tub 6 together with a detergent.

When the drum 8 is rotated by operation of the motor 10, the clothes are lifted to a predetermined height by the vanes 8a and then dropped from the vanes 8a so that the clothes can be washed by means of friction and impact. At this time, the heater 20 may be operated to heat the wash water in the tub 6 so that the washing efficiency is improved.

After the washing process is finished, the drainage pump is operated so that the wash water is discharged. Subsequently, the motor 10 is rotated at a high speed, and thus the drum 8 is also rotated at a high speed. When the drum 8 is rotated, the wash water contained in the clothes is separated from the clothes by means of the centrifugal force of the drum 8. At this time, the wash water separated from the clothes is discharged through the through-holes 8h. In this way, an intermittent dewatering process is performed. Thereafter, the water-supply valve is opened again so that wash water is supplied into the tub 6 and the drum 8. At the same time, the drum 8 is rotated so that a rinsing process is performed.

The aforementioned rinsing and intermittent dewatering processes are alternately and repeatedly carried out, and finally a dewatering process is performed. In this way, a cleaning process comprising washing, rinsing, and dewatering processes is completed.

In the conventional drum washing machine, however, the wash water is supplied into the tub 6 from the upper part thereof together with the detergent via the water-supply valve assembly 12 and the detergent box assembly 14, and the wash water supplied into the tub 6 is heated by the heater 20 mounted to the lower part of the tub 6. As can be easily understood from the above description, the wash water initially supplied into the tub is cold. Consequently, the wash water is slowly absorbed by the clothes.

The conventional drum washing machine includes the heater mounting part 6a of the tub 6, which is provided so that the heater 20 is mounted in the tub 6. The heater mounting part 6a is formed at the lower part of the tub 6 in such a manner that the heater mounting part 6a is downwardly extended from the tub 6. Consequently, it is required to provide an additional space necessary for forming the heater mounting part 6a in the tub 6, which complicates construction of the drum washing machine.

The wash water supplied in the tub 6 is heated by the heater 20. Since the heater 20 is mounted in the heater mounting part 6a of the tub 6, the wash water is also filled in the heater mounting part 6a of the tub 6, and thus the wash water filled in the heater mounting part 6a of the tub 6 is also heated. However, the wash water filled in the heater mounting part 6a of the tub 6 is not used to wash the clothes. Consequently, wash water and electric energy are uselessly wasted. In addition, the detergent is left with the wash water in the heater mounting part 6a of the tub 6, by which the washing efficiency of the drum washing machine is decreased.

SUMMARY OF THE INVENTION

Therefore, the present invention has been made in view of the above problems, and it is an object of the present invention to provide a steam jet drum washing machine which is capable of heating wash water and spraying the heated wash water into a tub and a drum of the washing machine in a phase of high-temperature and high-pressure steam, thereby rapidly soaking clothes in the wash water, reducing waste of the wash water and electric energy, and improving sterilizing and washing efficiencies of the drum washing machine.

In accordance with the present invention, the above and other objects can be accomplished by the provision of a steam jet drum washing machine comprising: a tub disposed in a casing and adapted so that wash water is supplied into the tub; a drum rotatably mounted in the tub and adapted so that clothes are put in the drum and the wash water is supplied into the drum; a water-supply unit disposed at one side of the tub for supplying the wash water into the tub and the drum; and a steam generator connected to the water-supply unit for heating the wash water to obtain high-temperature and high-pressure steam, and supplying the high-temperature and high-pressure steam into the tub and the drum.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
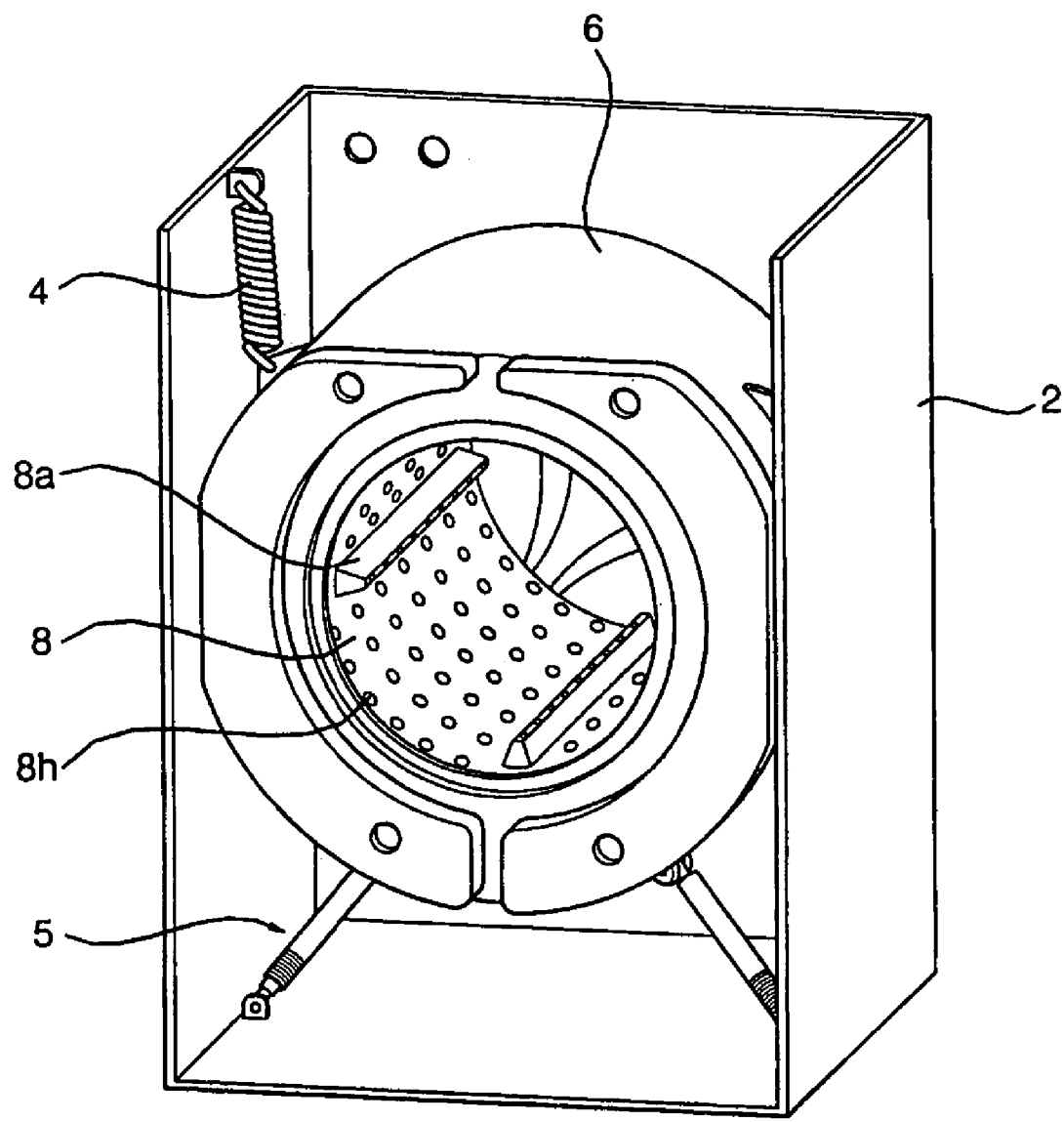
FIG. 1 is a perspective view of a conventional drum washing machine.
Figure 2:
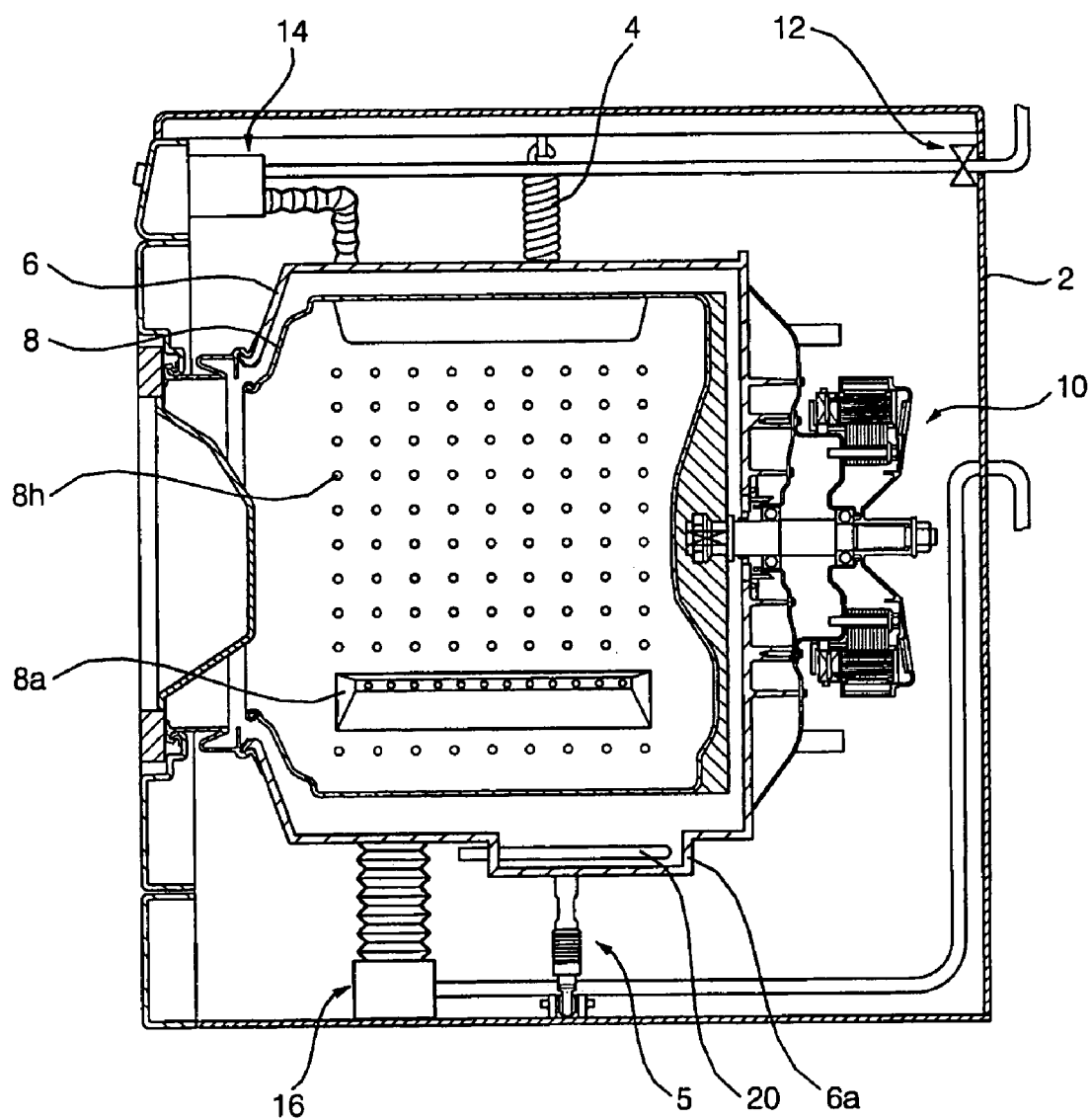
FIG. 2 is a side view, in cross section, of the conventional drum washing machine.

Now, preferred embodiments of the present invention will be described in detail with reference to the accompanying drawings. In the drawings, the same or similar elements are denoted by the same reference numerals even though they are depicted in different drawings.

Figure 3:
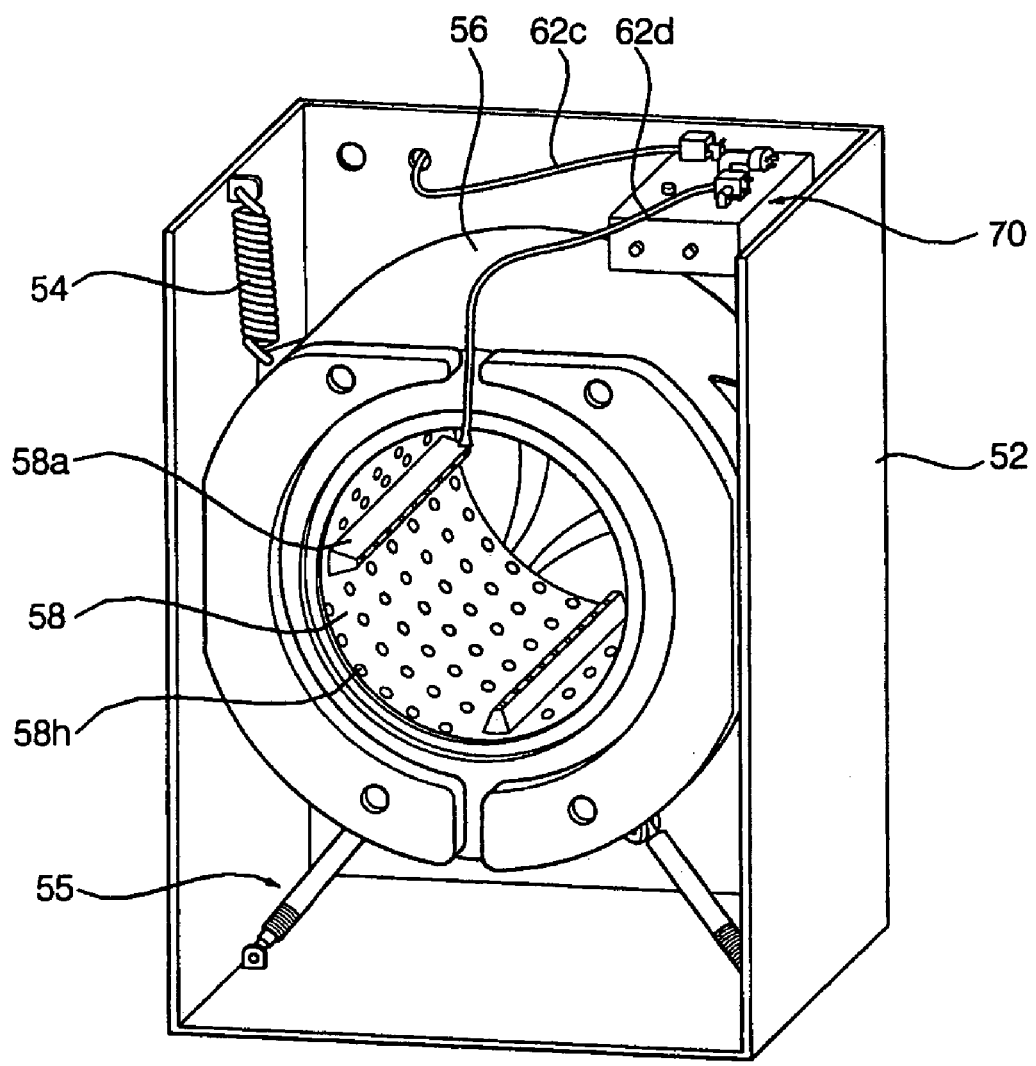
FIG. 3 is a perspective view of a steam jet drum washing machine according to a first preferred embodiment of the present invention.
Figure 4:
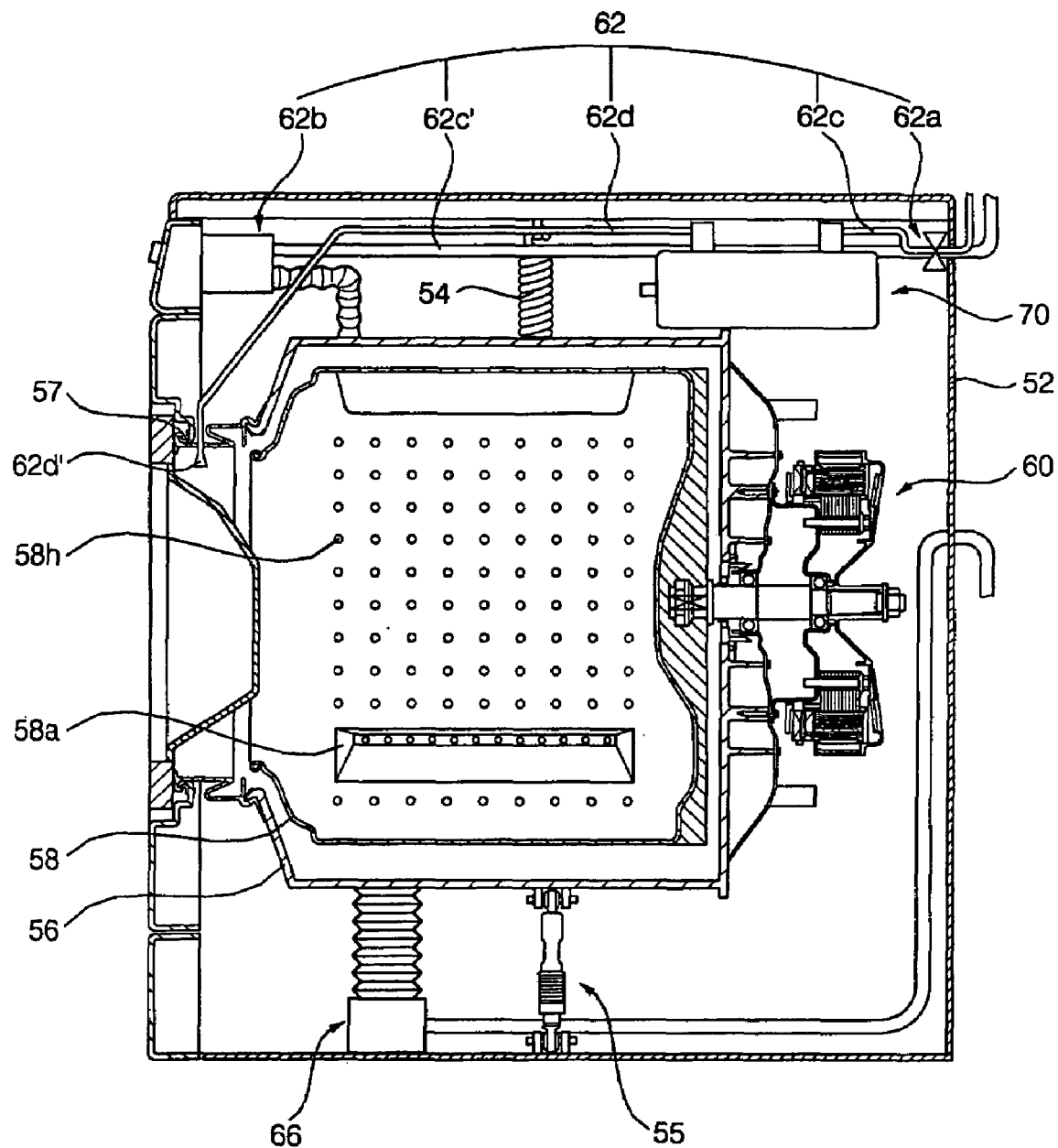
FIG. 4 is a side view, in cross section, of the steam jet drum washing machine according to the first preferred embodiment of the present invention.
Figure 5:
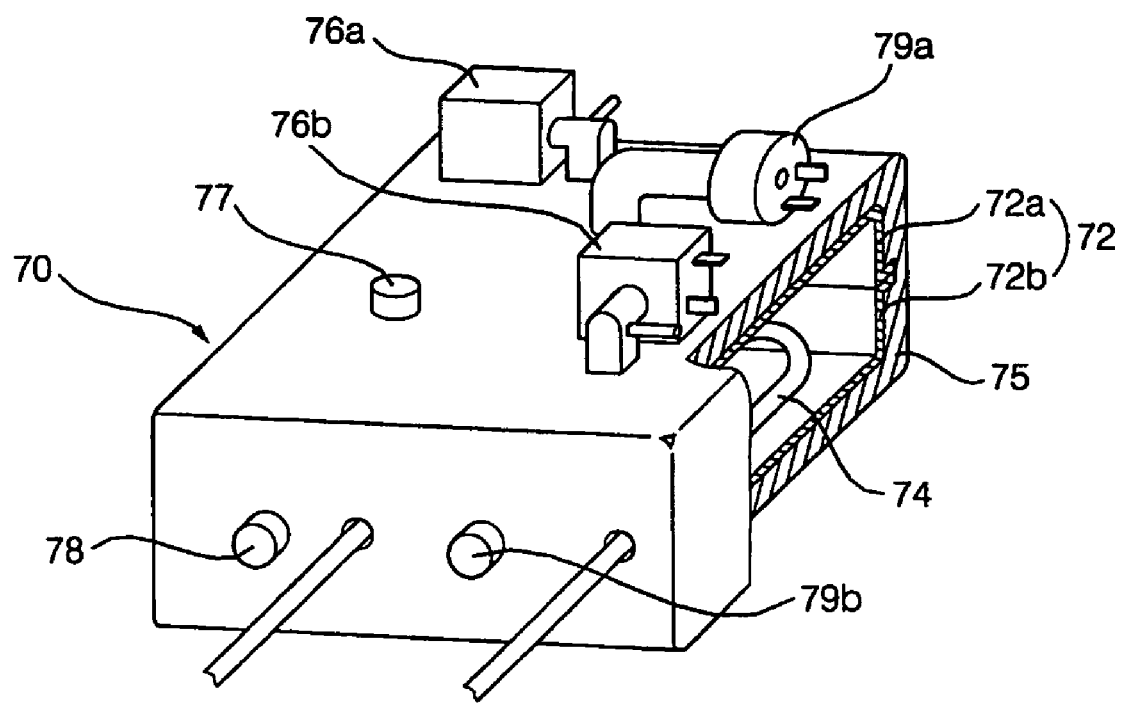
FIG. 5 is a perspective view, partially cutaway, of a steam generator of the present invention.

FIG. 3 is a perspective view of a steam jet drum washing machine according to a first preferred embodiment of the present invention, FIG. 4 is a side view, in cross section, of the steam jet drum washing machine according to the first preferred embodiment of the present invention, and FIG. 5 is a perspective view, partially cutaway, of a steam generator of the present invention.

As shown in FIGS. 3 and 4, the steam jet drum washing machine according to the first preferred embodiment of the present invention comprises: a casing 52 forming the exterior of the drum washing machine; a tub 56 disposed in the casing 52 in such a manner that the tub 56 is suspended by means of springs 54 and elastically supported by means of damper assemblies 55; a drum 58 rotatably mounted in the tub 56, in which clothes are put and into which wash water is supplied; a plurality of vanes 58a provided on the inner circumference of the drum 58 for lifting the clothes in the drum 58 as the drum 58 is rotated, the vanes 58a being longitudinally extended parallel to the axis of rotation of the drum 58 and inwardly protruded to a predetermined height while the vanes 58a are uniformly spaced apart from each other; a motor 60 connected to the drum 58 in the rear of the tub 56 for rotating the drum 58; and a steam generator 70 disposed above the tub 56 for heating the wash water to obtain high-temperature and high-pressure steam, which is supplied to the tub 56 and the drum 58.

The drum washing machine further comprises: a water-supply unit 62 mounted above the tub 56 for supplying wash water into the tub 56 and the drum 58; and a drainage pump assembly 66 mounted below the tub 56 for draining the wash water from the tub 56 and the drum 58. The steam generator 70 is connected to the water-supply unit 62.

The water-supply unit 62 comprises: a water-supply valve assembly 62a mounted to the rear of the casing 52 for supplying wash water; a detergent box assembly 62b mounted between the water-supply valve assembly 62a and the tub 56 for storing a detergent; a water-supply tube 62c connected between the water-supply valve assembly 62a and the steam generator 70; an auxiliary water-supply tube 62c' connected between the water-supply valve assembly 62a and the detergent box assembly 62b; and a steam tube 62d having one end connected to the steam generator 70 and the other end 62d' disposed in the tub 56 and the drum 58 for supplying the steam into the tub 56 and the drum 58.

Alternatively, the water-supply unit 62 may comprise the water-supply valve assembly 62a, the water-supply tube 62c, and the steam tube 62d so that the wash water is supplied into the tub 56 and the drum 58 via only the steam generator 70.

The drum 58 is provided at the inner circumference thereof with a plurality of through-holes 58h, through which the wash water flows between the drum 58 and the tub 56. When the drum 58 is rotated to dewater the clothes, the wash water contained in the clothes is separated from the clothes by means of the centrifugal force of the drum 58. At this time, the wash water separated from the clothes is discharged through the through-holes 58h. The water-supply valve assembly 62 includes a water-supply valve (not shown) so that the water-supply valve assembly 62 supplies wash water into the tub 56 and the drum 58 when the water-supply valve is opened. Similarly, the drainage pump assembly 66 includes a drainage pump (not shown) so that the drainage pump assembly 66 discharges the wash water from the tub 56 and the drum 58 when the drainage pump is operated.

The water-supply tube 62c is connected between the water-supply valve assembly 62a and the steam generator 70 so that the wash water is supplied into the steam generator 70. The auxiliary water-supply tube 62c' is connected between the water-supply valve assembly 62a and the detergent box assembly 62b so that the wash water is supplied into the detergent box assembly 62b.

The end 62d' of the steam tube 62d is formed in the shape of a nozzle so that steam is sprayed at a high speed from the end 62d'. The end 62d' of the steam tube 62d penetrates through the upper end of a gasket 57, which is made of rubber, for preventing leakage of water between the tub 56 and the casing 52. Consequently, the steam guided along the steam tube 62d is downwardly sprayed through the end 62d' of the steam tube 62d into the tub 56 and the drum 58.

The water-supply tube 62c and the steam tube 62d are relatively short by the provision of the steam generator 70. The steam generator 70 is disposed above the tub 56 between the tub 56 and the casing 52 so that repair and inspection of the stem generator 70 can be easily and conveniently conducted.

As shown in FIG. 5, the steam generator 70 comprises: an airtight pressure container 72 connected at the top end thereof to the water-supply tube 62c and the steam tube 62d and having an inner space for storing wash water defined therein; a heater 74 mounted in the pressure container 72 for heating the wash water stored in the pressure container 72; an inlet valve 76a disposed between the water-supply tube 62c and the pressure container 72 for supplying the wash water into the pressure container 72; and an outlet valve 76b disposed between the steam tube 62d and the pressure container 72 for supplying steam into the steam tube 62d.

The pressure container 72 comprises an upper container part 72a forming the upper part of the pressure container 72, and a lower container part 72b forming the lower part of the pressure container 72. The upper container part 72a and the lower container part 72b are preferably attached to each other by means of bolts (not shown).

The inlet valve 76a and the outlet valve 76b are pressure valves that can be opened or closed depending upon the pressure inside the pressure container 72. The inlet valve 76a may be controlled either electrically or mechanically so that the inlet valve 76a is opened when the pressure inside the pressure container 72 is below a predetermined pressure. Similarly, the outlet valve 76b may be controlled either electrically or mechanically so that the inlet valve 76a is opened when the pressure inside the pressure container 72 is over a predetermined pressure.

The steam generator 70 further comprises: a water level sensor 77 disposed at the upper part of the pressure container 72 for sensing the amount of the wash water stored in the pressure container 72 to control the operation of the inlet valve 76a and the outlet valve 76b; and a temperature sensor 78 disposed at the lower part of the pressure container 72 for sensing the temperature inside the pressure container 72 to control the operation of the heater 74 on the basis of the temperature inside the pressure container 72.

The water level sensor 77 senses the level of the wash water on the basis of the movement of a float on the wash water. Alternatively, the water level sensor 77 may sense the level of the wash water on the basis of the change in inside pressure of the pressure container 72 when the wash water is supplied into the pressure container 72.

The heater 74 is horizontally disposed in the lower container part 72b so that heater 74 can be submerged under the wash water even when the wash water is supplied into the pressure container 72 to the minimum water level.

The heater 74 is preferably formed in the shape of a curved pipe so that the heating surface area is increased. The heater 74 may be overheated while the heater 74 is energized. Consequently, there is preferably provided a safety unit for preventing overheating of the heater 74.

The safety unit comprises: an automatic pressure switch 79a disposed by the side of the water level sensor 77 for cutting off the supply of electric current to the heater 74 to primarily stop the operation of the heater 74 when the pressure inside the pressure container 72 is over a predetermined pressure; and an automatic temperature switch 79b, such as a thermostat, disposed by the side of the temperature sensor 78 for cutting off the supply of electric current to the heater 74 to secondarily stop the operation of the heater 74 when the temperature inside the pressure container 72 is over a predetermined temperature.

Additional automatic temperature switches 79b may be disposed for preventing overheating of the heater 74 when the automatic pressure switch 79a is not normally operated or when the pressure container 72 leaks.

The steam generator 70 further comprises a thermal insulator 75, such as Styrofoam, for shielding the pressure container 72 to prevent thermal energy generated in the pressure container 72 from leaking out of the pressure container 72 when the heater 74 is operated.

In the steam generator 70 with the above-stated construction, the operation of the heater 74, the inlet valve 76a, and the outlet valve 76b are controlled by a controller (not shown) for controlling the operation of the drum washing machine.

Figure 6:
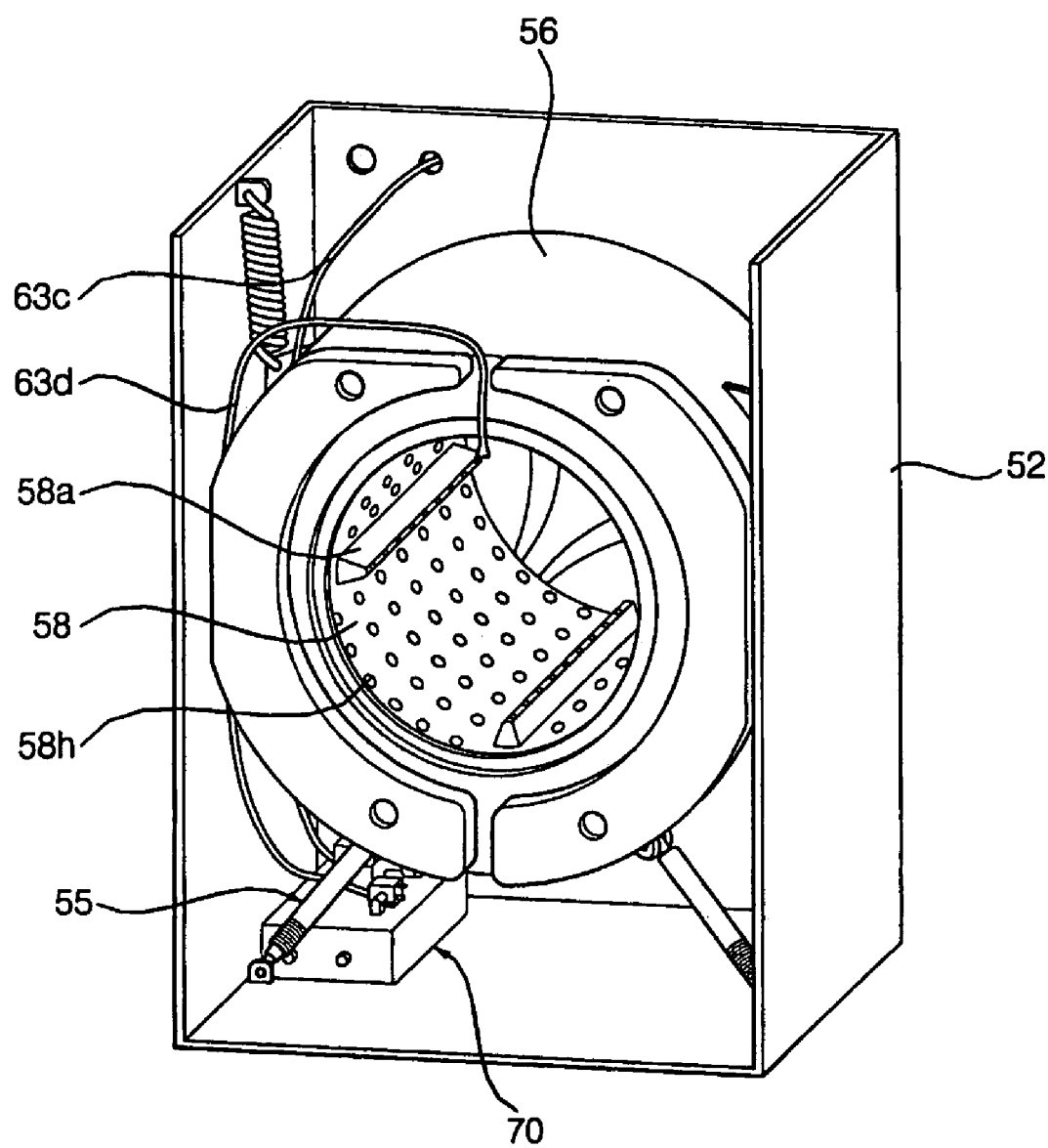
FIG. 6 is a perspective view of a steam jet drum washing machine according to a second preferred embodiment of the present invention.

FIG. 6 is a perspective view of a steam jet drum washing machine according to a second preferred embodiment of the present invention.

The steam jet drum washing machine according to the second preferred embodiment of the present invention is identical to the steam jet drum washing machine according to the first preferred embodiment of the present invention except that the steam generator 70 is disposed below the tub 56 between the tub 56 and the casing 52, as shown in FIG. 6.

Consequently, the water-supply tube 63c connected between the steam generator 70 and the water-supply valve assembly (not shown) is disposed between one side of the tub 56 and the casing 52. Similarly, the steam tube 63d connected between the steam generator 70 and the tub 56 is disposed between one side of the tub 56 and the casing 52.

When the steam generator 70 is disposed below the tub 56 as described above, an empty space defined below the tub 56 between the tub 56 and the casing 52 may be used as the installation space for the steam generator 70. Consequently, the total size of the drum washing machine is not increased even though the steam generator 70 is mounted in the drum washing machine.

The operation of the steam jet drum washing machine with the above-stated construction according to the present invention will now be described.

When a washing process is performed while clothes are put in the drum 58, the water-supply valve is opened so that a proper amount of wash water is supplied into the tub 56 and the drum 58 depending upon the amount of the clothes. The wash water passes through the auxiliary water-supply tube 62c', and then passes through the detergent box assembly 62b. The wash water having passed through the detergent box assembly 62b is supplied into the tub 56 together with a detergent.

When the wash water is to be sprayed in a phase of steam according to a user's selection, the wash water passes through the water-supply tube 62c, and is then supplied into the steam generator 70 where the wash water is heated to obtain high-temperature and high-pressure steam. The high-temperature and high-pressure steam generated in the steam generator 70 is sprayed into the tub 56 and the drum 58 via the steam tube 62d.

Specifically, when the water-supply valve is opened so that the wash water is supplied via the water-supply tube 62c, the wash water is supplied into the pressure container 72 while the inlet valve 76a and the outlet valve 76b are opened. As the wash water is supplied into the pressure container 72, the water level sensor 77 senses the level of the wash water in the pressure container 72.

At this time, the inlet valve 76a is opened so that the wash water is supplied into the pressure container 72, and the outlet valve 76b is opened so that air is discharged from the pressure container 72.

When a proper amount of the wash water is supplied into the pressure container 72, the inlet valve 76a and the outlet valve 76b are closed, and simultaneously the heater 74 is operated to heat the wash water so that high-temperature and high-pressure steam is generated.

Since the heater 74 is operated in the airtight space in the pressure container 72, higher-temperature and higher-pressure steam may be generated as the heater 74 is operated for a longer time.

At this time, the temperature sensor 78 senses the temperature of the interior of the pressure container 72, and the operation of the heater 74 is controlled on the basis of the sensed temperature so that the heater 74 is not overheated.

When the temperature sensor 78 is out of order or abnormally operated, the automatic pressure switch 79a and the automatic temperature switch 79b are operated to cut off the supply of electric current to the heater 74 so that overheating of the heater 74 is prevented.

When the heater 74 is operated, the wash water supplied into the airtight pressure container 72 is heated to generate high-temperature and high-pressure steam. When the temperature sensor 78 senses that the temperature of the interior of the pressure container 72 is over a predetermined pressure, the outlet valve 76b is opened so that the steam passes through the steam tube 62d and is then sprayed into the tub 56 and the drum 58.

At this time, the steam is sprayed into the tub 56 and the drum 58 through the end 62d' of the steam tube, which is formed in the shape of a nozzle. As a result, the clothes are rapidly soaked.

When a proper amount of the wash water is supplied into the tub 56 and the drum 58, the water-supply valve is closed, and the motor 60 is operated. When the drum 58 is rotated by operation of the motor 60, the clothes are lifted to a predetermined height by the vanes 58a and then dropped from the vanes 58a. In this way, a washing process is performed.

After the washing process is finished, the drainage pump is operated so that the wash water is discharged. Subsequently, the motor 60 is rotated at a high speed, and thus the drum 58 is also rotated at a high speed. When the drum 58 is rotated, the wash water contained in the clothes is separated from the clothes by means of the centrifugal force of the drum 58. In this way, an intermittent dewatering process is performed. The water-supply valve is opened again so that wash water is supplied into the tub 56 and the drum 58 to a predetermined level via the auxiliary water-supply tube 62c'. Thereafter, the drum 58 is rotated so that a rinsing process is performed.

The aforementioned rinsing and intermittent dewatering processes are alternately and repeatedly carried out, and finally a dewatering process is performed. In this way, a process for cleaning the clothes is completed.

It should be noted that the wash water may be supplied into the steam generator 70 where the wash water is heated to obtain high-temperature and high-pressure steam, and the high-temperature and high-pressure steam may be sprayed into the tub 56 and the drum 58 even when the clothes are washed or rinsed as well as when the wash water is initially supplied into the tub 56 and the drum 58, in order to improve sterilizing and washing efficiencies of the drum washing machine.

As apparent from the above description, the present invention provides a steam jet drum washing machine characterized in that wash water is supplied into a steam generator where the wash water is heated to obtain high-temperature and high-pressure steam, and the steam is sprayed into a tub and a drum of the drum washing machine, thereby rapidly soaking clothes in the wash water when the wash water is initially supplied into the tub and the drum, saving wash water and electric energy. Furthermore, the wash water is supplied in a phase of high-temperature and high-pressure steam when clothes are washed and rinsed, whereby sterilizing and washing efficiencies-of the drum washing machine are improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A steam drum washing machine comprising:
    a casing;
    a tub disposed in the casing and adapted so that water is supplied into the tub;
    a drum rotatably mounted in the tub and adapted so that clothes are put in the drum and the water is supplied into the drum;
    a steam generator to heat water to obtain steam and to supply the steam into the tub and the drum; and
    a water-supply unit to supply the water into the tub and to the steam generator, wherein the water-supply unit includes:
        a water-supply valve assembly to supply the water;
        a detergent box assembly mounted between the water-supply valve assembly and the tub for storing a detergent; and
        an auxiliary water-supply tube connected between the water-supply valve assembly and the detergent box assembly.

2. The machine as set forth in claim 1, wherein the water-supply unit comprises:
    a water-supply tube connected at one end thereof to the steam generator for supplying the water into the steam generator.

3. The machine as set forth in claim 1, wherein the water-supply unit includes a steam tube having one end connected to the steam generator and the other end disposed in the tub, the end of the steam tube disposed in the tub being formed in the shape of a nozzle.

4. The machine as set forth in claim 1, further comprising a gasket located between the tub and the casing to prevent leakage.

5. The machine as set forth in claim 1, wherein the steam generator is disposed in the casing.

6. The machine as set forth in claim 1, wherein the steam generator is disposed below the tub between the tub and the casing.

7. The machine as set forth in claim 1, wherein the steam generator is disposed above the tub between the tub and the casing.

8. The machine as set forth in claim 1, wherein the water-supply unit is disposed in the casing.

9. The machine as set forth in claim 1, wherein the steam generator comprises:
    a pressure container; and
    a heater mounted in the pressure container for heating the water in the pressure container.

10. The machine as set forth in claim 1, wherein the steam generator comprises a safety unit for preventing overheating of the heater.

11. The machine as set forth in claim 9, wherein the pressure container comprises:
   an upper container part forming the upper part of the pressure container; and
   a lower container part forming the lower part of the pressure container.

12. The machine as set forth in claim 9, wherein the steam generator comprises a thermal insulator for shielding the pressure container.

13. The machine as set forth in claim 9, further comprising a temperature sensor to sense the temperature inside the pressure container, and the heater is selectively operated based on the sensed temperature sensed by the temperature sensor for adjusting the temperature of the steam to maintain the steam at a predetermined temperature.

14. The machine as set forth in claim 1, wherein the water-supply unit includes a steam tube having one end connected to the steam generator and the other end disposed in the tub, the one end of the steam tube connected to the steam generator is located higher then the other end of the steam tube disposed in the tub.

15. The machine as set forth in claim 1, wherein the water-supply unit includes a steam tube having one end connected to the steam generator and the other end disposed in the tub, and the machine further comprising a gasket located between the tub and the casing and wherein the end of the steam tube penetrates through the upper end of the gasket.

16. The machine as set forth in claim 15, wherein the end of the steam tube disposed in the tub is formed in the shape of a nozzle.

17. The machine as set forth in claim 1, wherein the water-supply unit includes a steam tube having one end connected to the steam generator and the other end disposed in the tub for supplying the steam into the tub and the drum.

18. The machine as set forth in claim 17, wherein the steam generator comprises:
   an airtight pressure container connected to the water-supply tube and the steam tube between the water-supply tube and the steam tube;
   a heater mounted in the pressure container for heating the water stored in the pressure container;
   an inlet valve disposed between the water-supply tube and the pressure container for supplying the water into the pressure container; and
   an outlet valve disposed between the steam tube and the pressure container for supplying the steam into the steam tube.

19. The machine as set forth in claim 18, wherein the steam generator further comprises a water level sensor for sensing the amount of the water stored in the pressure container to control the operations of the inlet valve and the outlet valve.

20. The machine as set forth in claim 18, wherein the steam generator further comprises a temperature sensor for sensing the temperature inside the pressure container to control the operation of the heater on the basis of the temperature inside the pressure container.

21. The machine as set forth in claim 18, wherein the steam generator further comprises an automatic pressure switch for stopping the operation of the heater when the pressure inside the pressure container is over a predetermined pressure.

22. The machine as set forth in claim 18, wherein the steam generator further comprises an automatic temperature switch for stopping the operation of the heater when the temperature inside the pressure container is over a predetermined temperature.

23. The machine as set forth in claim 18, wherein the steam generator further comprises a thermal insulator for shielding the pressure container.

24. The machine as set forth in claim 18, wherein the pressure container comprises an upper container part forming the upper part of the pressure container, and a lower container part forming the lower part of the pressure container, the upper container part and the lower container part being attached to each other.

25. The machine as set forth in claim 18, wherein the inlet valve and the outlet valve are pressure valves that can be opened or closed depending upon the pressure inside the pressure container.

26. The machine as set forth in claim 18, wherein the heater is horizontally disposed in the lower part of the pressure container so that the heater can be submerged under the water even when the water is supplied into the pressure container to the minimum water level.

27. The machine as set forth in claim 26, wherein the heater is an electric heater formed in the shape of a curved pipe.

28. The machine as set forth in claim 17, further comprising a gasket located between the tub and the casing and wherein the end of the steam tube penetrates through the upper end of the gasket.

* * * * *